United States Patent [19]

Shimamura et al.

[11] Patent Number: 4,835,970
[45] Date of Patent: Jun. 6, 1989

[54] PNEUMATIC POWER BRAKE SYSTEM

[75] Inventors: Morihiko Shimamura, Higashimatsuyama; Jun Kubo, Hino; Hitoshi Kubota, Minamiashigara; Norio Fujiki, Yokohama; Yoshio Tobisawa, Higashimatsuyama; Yasuki Ishikawa; Kazuyoshi Fukawa, both of Yokosuka, all of Japan

[73] Assignee: Nissan Motor Co. Ltd., Japan

[21] Appl. No.: 894,368

[22] Filed: Aug. 7, 1986

[30] Foreign Application Priority Data

Aug. 13, 1985 [JP] Japan ............... 60-178001
Aug. 13, 1985 [JP] Japan ............... 60-177996
Aug. 13, 1985 [JP] Japan ............... 60-177997
Aug. 13, 1985 [JP] Japan ............... 60-177999
Aug. 13, 1985 [JP] Japan ............... 60-178000

[51] Int. Cl.⁴ ............................. F15B 7/00
[52] U.S. Cl. ............................ 60/545; 91/461; 303/16; 303/57
[58] Field of Search .......... 60/545, 547.1, 548, 60/574; 91/461, 459, 391 A, 391 R; 303/13, 16, 17, 22 R, 29, 30, 57, DIG. 3

[56] References Cited

U.S. PATENT DOCUMENTS

| | | | |
|---|---|---|---|
| 4,206,605 | 6/1980 | Mehren et al. | 60/545 |
| 4,436,347 | 3/1984 | Stumpe | 303/6 R |
| 4,557,527 | 10/1985 | Stumpe | 303/15 |
| 4,606,586 | 8/1986 | Eckert | 303/93 |
| 4,706,459 | 11/1987 | Burckhardt | 60/545 |

FOREIGN PATENT DOCUMENTS

| | | |
|---|---|---|
| 136689 | 4/1985 | European Pat. Off. . |
| 1961089 | 6/1979 | Fed. Rep. of Germany . |
| 3215475 | 11/1983 | Fed. Rep. of Germany . |
| 3240277 | 5/1984 | Fed. Rep. of Germany . |
| 58-188746 | 11/1983 | Japan . |

Primary Examiner—Henry A. Bennet
Attorney, Agent, or Firm—Leydig, Voit & Mayer

[57] ABSTRACT

A relay valve is operatively disposed between a pressurized air source and a work chamber of a brake booster. The relay valve has a pilot chamber so that the relay valve can feed the work chamber with a pressurized air, the pressure of which corresponding to that of a pressure applied to the pilot chamber. Electromagnetic valves are arranged to selectively connect the pilot chamber with the pressurized air source and the atmosphere. The valves are so controlled by an electronic control unit that the pilot chamber is supplied with pressurized air the pressure of which being determined in accordance with a brake pedal force applied from a brake pedal to an input means of the booster.

8 Claims, 7 Drawing Sheets

PNEUMATIC POWER BRAKE SYSTEM

BACKGROUND OF THE INVENTION

1. Field of the Invention

The present invention relates in general to a pneumatic power brake system which permits the driver to easily brake the vehicle by exerting only a little pressure on the brake pedal, and more particularly to a pneumatic power brake system equipped with an electronic pressure control device by which the pressure applied to a work chamber of a brake booster is approximately controlled in accordance with a brake pedal force applied to the booster from the brake pedal.

2. Description of the Prior Art

Hitherto, various kinds of brake boosters have been proposed and put into practical use in the field of automotive brakes. Some of them are of a pneumatic type which uses a pressurized air as a medium for practically actuating a power piston of the brake booster. Japanese Patent First Provisional Publication No. 58-188746 proposes to incorporate the boosters of such type with an electronic pressure control means by which the pressure applied to the work chamber of the booster is electronically controlled in accordance with a brake pedal force applied to the booster from the brake pedal. In this connection, the Publication shows an input pressure detecting means mounted in the booster, which means detects the brake pedal force applied from the brake pedal. Since the output characteristic of the booster can be easily changed by only adjusting the control means, the brake systems of such type are widely applicable to various types of motor vehicles.

However, due to the inherent constructions of the control means, the conventional pneumatic power brake systems of such type hitherto proposed have failed to exhibit satisfactory performance. That is, they do not quickly feed stable pressure to the work chamber of the brake booster.

SUMMARY OF THE INVENTION

It is therefore an essential object of the present invention to provide a pneumatic power brake system which can quickly feed the work chamber with stable pressure upon depression of the brake pedal.

According to the present invention, there is provided a pneumatic power brake system which comprises a pressurized air source, a brake booster with a work chamber, a pedal force detecting means for detecting a brake pedal force applied to an input means of the brake booster, a relay valve fluidly connected to both the pressurized air source and the work chamber and interposed therebetween, and relay valve having a pilot chamber so that the relay valve is capable of feeding the work chamber with a pressurized air, the pressure of which corresponding to that of a pressure applied to the pilot chamber, an electromagnetically operated valve means which selectively connects the pilot chamber with the pressurized air source and the atmosphere, and an electronic control unit which controls the electromagnetically operated valve means in such a manner than the pilot chamber is supplied with a pressurized air, the pressure of which being determined in accordance with the brake pedal force applied to the input means of the booster.

DETAILED DESCRIPTION OF THE INVENTION

In the following description, the terms 'upper', 'lower2 , 'right', 'left', 'upward', 'downward' and the like should be taken to mean 'upper' 'lower'. . . and 'downward', as viewed in the corresponding drawings.

Figure 1:
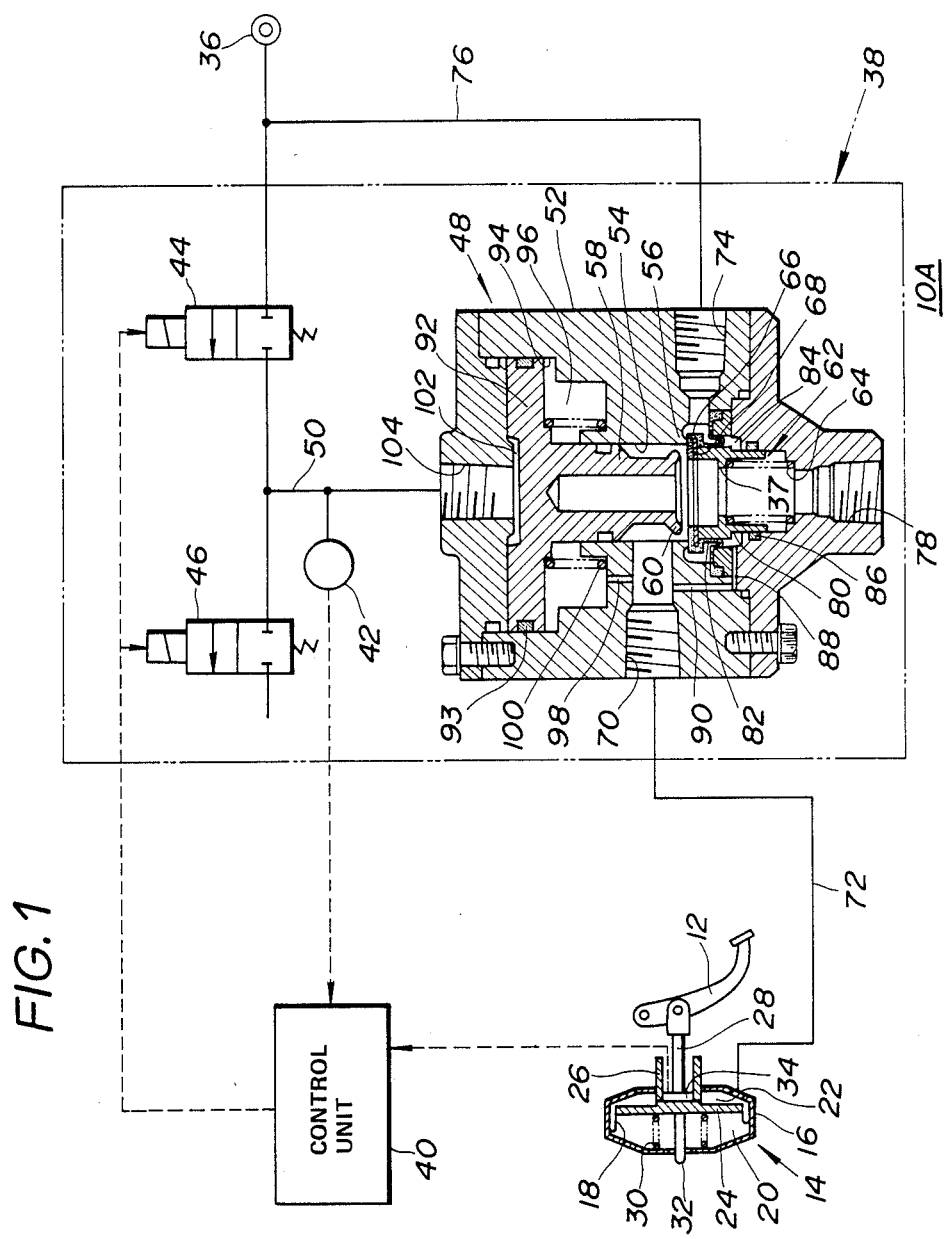
FIG. 1 is a block diagram of a pneumatic power brake system of a first embodiment of the present invention.
Figure 2:
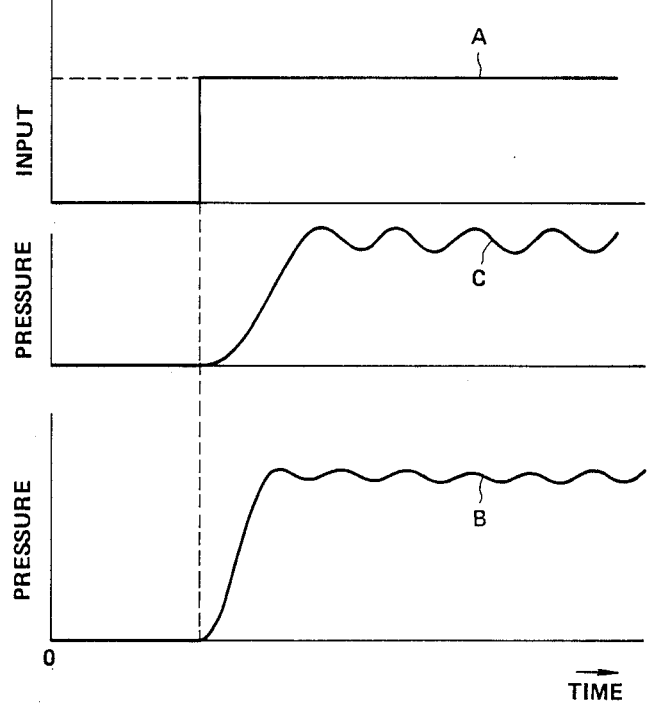
FIG. 2 is a graph showing various characteristics given in the system of the first embodiment.

Referring to FIGS. 1 and 2, particularly FIG. 1, there is shown a pneumatic power brake system 10A of a first embodiment of the present invention.

In the drawing, denoted by numeral 12 is a brake pedal pivotally mounted to a vehicle body (not shown), and denoted by numeral 14 is a pneumatic brake booster which produces a multiplied brake pressure in response to operation of the brake pedal 12.

The brake booster 14 comprises generally a housing 16, a diaphragm 18 dividing the interior of the housing 16 into first and second (or work) chambers 20 and 22, and a power piston 24 attached to the diaphragm 18 to move therewith. A cylindrical body 26 is coaxially connected to the power piston 24 and projected rearwardly outwardly from the housing 16 through the second chamber 22. The body 26 is linked to the brake pedal 12 through an input rod 28 which is pivotally connected to the body 26. A return spring 30 is disposed in the first chamber 20 to bias the power piston 24 rightward, that is, toward its rest position. An output rod 32 is connected to the power piston 24 and projected forwardly outwardly through the first chamber 20. Although not shown in the drawing, the output rod 32 is operatively connected to a piston of a brake master cylinder.

For the purpose which will be clarified as the description proceeds, a pedal force detecting device 34 is mounted in the brake booster 14 in order to detect a brake pedal force applied to the input rod 28 from the brake pedal 12. Such device 34 is disclosed in Japanese Patent Application No. 60-177991 (which has a corresponding U.S. patent application Ser. No. 06/894,040 filed Aug. 7, 1986).

The first chamber 20 of the housing 16 is constantly communicated with the atmosphere through an opening formed in the housing 16, while, the second chamber 22 is communicated with a pressurized air source 36 through an electronic pressure control valve unit 38 which will be described in detail below.

The operation of the pressure control valve unit 38 is controlled by a control unit 40 which generally comprises a microcomputer. Upon receiving information signals from the pedal force detecting device 34 and an after-mentioned pressure sensor 42, the control unit 40 controls the open-close operations of first and second electromagnetic valves 44 and 46 of the control valve unit 38 in such a manner as will be described hereinafter. The control valve unit 38 functions to supply the second chamber 22 of the brake booster 14 with a pressurized air, the pressure of which being determined in accordance with a pilot pressure applied to a pilot chamber (102) formed in the control valve unit 38.

The control valve unit 38 comprises generally the first and second electromagnetic valves 44 and 46 and a relay valve 48 which are fluidly connected to one another as is seen from the drawing. That is, the first electromagnetic valve 44 is interposed between the air source 36 and the pilot chamber (102) to selectively open and close the communication therebetween, while, the second electromagnetic valve 46 is interposed between the atmosphere and the pilot chamber (102) to selectively open and close the communication therebetween. In the illustrated embodiment, a line 50 is used for connecting the first and second electromagnetic valves 44 and 46 to the pilot chamber (102). A pressure sensor 42 is connected to the line 50 to detect the pressure in the pilot chamber (102). The pressure representing signal from the pressure sensor 42 is fed to the control unit 40.

The relay valve 48 comprises a cylindrical housing 52 which generally consists of three coaxially arranged parts (no numerals). The housing 52 has an axially extending stepped bore 54 formed therethrough, in which a valve mechanism (no numeral) is arranged in a manner as will be described hereinnext.

The valve mechanism comprises a first valve seat 56 formed on an annular step defined in a middle portion of the bore 54. For defining the step, the bore 54 has a first enlarged portion (no numeral) below the step 56. A plunger 58 is axially slidably received in the bore 54 with its diametrically reduced lower end projected toward the first enlarged portion of the bore 54. The lower end of the plunger 58 is formed with a second valve seat 60. It is to be noted that the second valve seat 60 is coaxially arranged within the first valve seat 56 with an annular clearance defined therebetween.

A tubular valve body 62 is axially slidably received in the bore 54 at a position below the first valve seat 56. A coil spring 64 is compressed between the valve body 62 and a stepped portion of the bore 54 to bias the valve body 62 upward. With the force of the spring 64, an upper annular flat portion of the valve body 62 is biased to sealingly abut on the first valve seat 56. The upper annular flat portion of the valve body 62 comprises a first sealing portion 66 which is sealingly contactable with the first valve seat 56 and a second sealing portion 68 which is sealingly contactable with the second valve seat 60.

A first port 70 is formed in the left portion of the housing 52, which leads to the bore 54 at the position above the first valve seat 56. The first portion 70 is communicated with the second chamber 22 of the brake booster 14 through a line 72.

A second port 74 is formed in the right portion of the housing 52, which leads to the afore-mentioned first enlarged portion of the bore 54 defined below the first valve seat 56. The second port 74 is communicated with a pressurized air source 36 through a line 76.

A third port 78 is formed in the lower portion of the housing 52, which leads to the interior of the tubular valve body 62 and thus to the first enlarged portion of the bore 54. The third port 78 is exposed to the atmosphere.

The tubular valve body 62 has a smaller diameter lower portion defining a stepped portion 80 thereon. A diaphragm member 82 extends between the valve body 62 and the wall of the bore 54 to define a pressure chamber 84 to which the stepped portion 80 is exposed. An annular seal ring 86 is arranged to effect sealing between the tubular valve body 62 and the wall of the bore 54 thereby to isolate the pressure chamber 84 from the surrounding.

The pressure chamber 84 is communicated with the first port 70 through two passages 88 and 90 formed in the housing 52. It is to be noted that the pressure receiving area of the stepped portion 80 is equal to that of the afore-mentioned annular space defined between the first and second valve seats 56 and 60. When, thus, equal pressure is applied to them, the positioning of the valve body 62 is balanced.

The plunger 58 is integrally formed at its upper portion with a diametrically enlarged piston 92 which is sealingly and slidably received in a second enlarged portion 94 of the bore 54. A seal 93 is disposed about the piston 92 to effect sealing between the piston 92 and the wall of the second enlarged portion 94 of the bore 54. With the provision of the piston 92, there is defined below the piston a pressure chamber 96 which is communicated with the first port 70 through a passage 98 formed in the housing 52. A coil spring 100 is disposed in the pressure chamber 96 and compressed between the piston 92 and a recessed part of the pressure chamber 96 to bias the plunger 58 and thus the piston 92 upwardly. Under a condition wherein, as is shown in FIG. 1, the plunger 58 assumes its upper most position, the second valve seat 60 thereof is separated from the upper flat portion of the valve body 62 while keeping the sealing contact between the first valve seat 56 and the valve body 62. Thus, under this condition, the second chamber 22 of the brake booster 14 is communicated to the atmosphere through the first port 70, the clearance between the second valve seat 60 and the valve body 62, the interior of the valve body 62 and the third port 78.

Defined above the piston 92 in the bore 54 is another pressure chamber 102 which constitutes the afore-mentioned pilot chamber. The pilot chamber 102 includes a recess (no numeral) which is formed in the upper side of the piston 92 and exposed to a fourth port 104 formed in the upper portion of the housing 52. The fourth port 104 is connected to the line 50 which leads to both the first and second electromagnetic valves 44 and 46, as shown.

In the following, operation of the first embodiment 10A will be described with reference to FIGS. 1 and 2.

For ease of description, it will be commenced with respect to a rest condition of the brake booster 14 wherein no brake pedal force is applied to the input rod 28 of the booster 14 from the brake pedal 12. Application of no brake pedal force to the input rod 28 is sensed by the pedal force detecting device 34 which is mounted in the booster 14. Upon sensing this, the control unit 40 closes the first electromagnetic valve 44 and at the same time opens the second electromagnetic valve 46, so that the pilot chamber 102 is exposed to the atmosphere. Under this condition, the plunger 58 assumes its uppermost position and thus, the second chamber 22 of the booster 14 is communicated with the atmosphere through the line 72, the first port 70, the clearance between the second valve seat 60 and the upper flat portion of the valve body 62, the interior of the valve body 62 and the third port 78. Thus, no pressure difference is produced between the first and second chambers 20 and 22 of the brake booster 14, and thus the power piston 24 assumes its rightmost or rest position due to the biasing force of the return spring 30.

When the brake pedal 12 is depressed, a certain brake pedal force is applied to the input rod 28 of the booster 14 (see the line 'A' of FIG. 2), the intensity of the force is detected by the pedal force detecting device 34. The control unit 40 then closes the second electromagnetic valve 46 and at the same time opens the first electromagnetic valve 44, so that the pilot chamber 102 is supplied with pressurized air from the pressurized air source 36. Upon this, the piston 92 and thus the plunger 58 are moved downward to such positions as to press the second valve seat 60 against the upper flat portion of the valve body 62 blocking the communication between the second chamber 22 of the booster 14 and the atmosphere. The pressure application to the pilot chamber 102 further moves the plunger 58 and thus the tubular valve body 62 downward against the biasing force of the spring 64, separating the upper flat portion of the valve body 62 from the first valve seat 56. With this, the pressurized air from the air source 36 is applied to the second chamber 22 of the booster 14 through the line 76, the second port 74, the clearance between the first valve seat 56 and the valve body 62, the first port 70 and the line 72. Thus, the power piston 24 of the booster 14 is moved leftward against the force of the return spring 30.

During this operation, the pressure applied to the pilot chamber 102 kept is detected by the pressure sensor 42. When the detected pressure in the pilot chamber 102 increases to a desired degree which is determined by the information signal issued from the pedal force detecting device 34, the control unit 40 closes the first electromagnetic valve 44 thereby isolating the pilot chamber 102 from the surrounding and thus thereafter keeping the pressure in the pilot chamber 102 constant. The plunger 58 then moves upwardly and stops at a balanced position wherein the pressure in the pressure chamber 96 (which is constantly communicated with the second chamber 22 of the brake booster 14 through the passage 98) is balanced with that in the pilot chamber 102. Thus, the valve body 62 is brought into sealing contact with the first valve seat 56 thereby blocking the communication between the second chamber 22 of the booster 14 and the pressurized air source 36. At the balanced position, the second valve seat 60 of the plunger 58 is in sealing contact with the valve body 62 blocking the communication between the second chamber 22 of the booster and the atmosphere. As a result, the second chamber 22 of the booster 14 contains a pressurized air, the pressure of which being determined in accordance with the brake pedal force applied to the input rod 28 from the brake pedal 12 (see the curve 'B' in FIG. 2). Thus, the power piston 24 and the output rod 32 are moved leftward with a desired multiplied force to actuate the piston of the brake master cylinder for braking the vehicle.

When, the brake pedal 12 is released and no brake force is applied to the input rod 28 of the booster 14, the pedal force detecting device 34 issues a corresponding information signal to the control unit 40. With this, the control unit 40 instantly opens the second electromagnetic valve 46 keeping the first electromagnetic valve 44 in its closed position. Thus, the piston 92 and thus the plunger 58 are moved upward to their uppermost positions due to the force of the spring 100, so that the pressurized air in the second chamber 22 of the booster 14 is discharged into the atmosphere through the line 72, the first port 70, the clearance between the upper flat portion of the valve body 62 and the second valve seat 60 of the plunger 58, the interior 37 of the valve body 62 and the third port 78. Thus, the power piston 24 is moved back to its rest position due to the force of the return spring 30 returning the piston of the brake master cylinder to its rest position.

It is to be noted that usage of the relay valve 48 as described hereinabove induces a quick supply of controlled pressure to the second chamber of the brake booster 14. This is because the open-close operation of such valve, which can handle a considerable amount of pressurized air, can be controlled by the pressure in the small-sized pilot chamber 102 which permits quick movement of the plunger 58. That is, in the invention, a desired pressure is quickly prepared in the second chamber 22 of the brake booster 14 in response to depression of the brake pedal 12.

It is further to be noted that, as will be seen from the curve 'B' of the graph of FIG. 2, usage of the pressure in the pilot chamber 102 for producing a feedback signal applied to the control unit 40 is very effective in supplying the second chamber 22 of the booster 14 with a stable pressure having less pulsation. That is, if the pressure in the second chamber 22 of the booster 14 is used for producing such feedback signal, the pressure in the second chamber 22 is forced to have a great pulsation due to an unavoidable time lag which would appear between the pressure variation in the pilot chamber 102 and that in the second chamber 22 of the booster 14. This will be understood from the curve 'C' of the graph.

Figure 3:
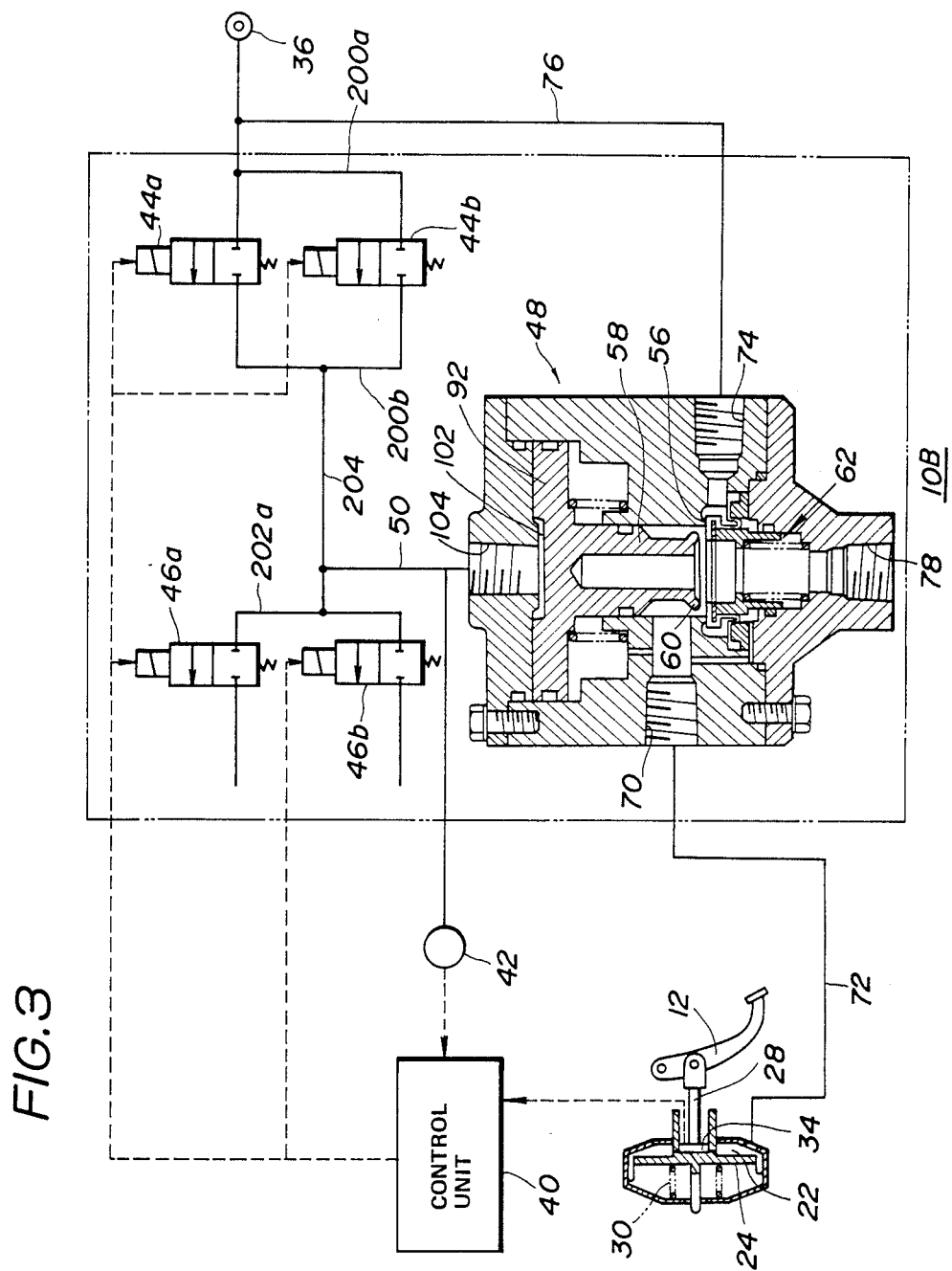
FIG. 3 is a view similar to FIG. 1, but showing a second embodiment of the present invention.

Referring to FIG. 3, there is shown a second embodiment of the present invention, which is generally designated by numeral 10B.

As the second embodiment 10B is substantially the same as the afore-described first embodiment 10A except the arrangement of the electromagnetic valves, only the arrangement of the valves will be described in the following.

In the second embodiment 10B, four electromagnetic valves 44a, 44b, 46a and 46b are employed, which are all controlled by the control unit 40 in a manner as will be described hereinafter. As is shown in the drawing, the valves 44a and 44b are connected in parallel through upstream and downstream lines 200a and 200b. The upstream line 200a is connected to the pressurized air source 36. The other valves 46a and 46b are also connected in parallel through an upstream line 202a. The line 202a is connected to the downstream line 200b of the valves 44a and 44b through a line 204. The downstream sides of the valves 46a and 46b are communicated to the atmosphere through respective lines (no numerals). The line 204 is connected through a line 50 to the fourth port 104 of the relay valve 48.

Operation of the second embodiment 10B will be described.

Under a rest condition of the brake system 10B wherein no force is applied to the brake pedal 12, the valves 44a and 44b are closed and the other valves 46a and 46b are opened so that the pilot chamber 102 is open to the atmosphere and thus, the second chamber 22 of the booster 14 is open to the atmosphere. Thus, under this condition, the power piston 24 of the brake booster 14 assumes its rest position.

Figure 4:
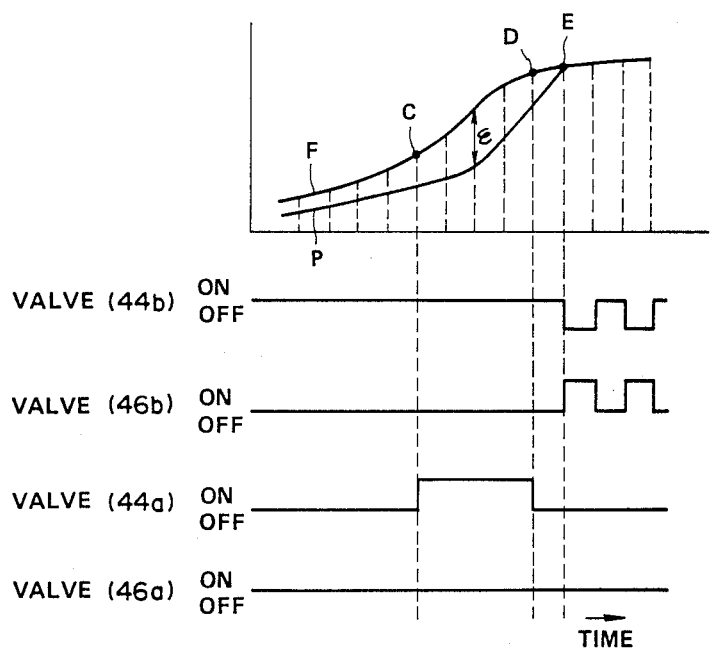
FIG. 4 is a graph showing various modes of valves used in the system of the second embodiment.

When the brake pedal 12 is depressed and a certain brake force is applied to the input rod 28 of the booster 14, the intensity of the force is detected by the pedal force detecting device 34. The control unit 40 then compares a pressure value determined by the information signal issued from the pedal force detecting device 34 with the existing pressure in the pilot chamber 102 with respect to the elapsed time and make a judgement as to whether the depression of the brake pedal 12 is rapid depression, that is, whether the depression of the brake pedal 12 requires a rapid pressure increase in the second chamber 22 of the booster 14. This will be understood from the graph of FIG. 4. In the graph, the curve 'F' represents the value of target pressure which is determined by the information signal from the pedal force detecting device 34. As is seen from this graph, the pressure value increases as the time passes. The other curve 'P' represents the pressure in the pilot chamber 102, which is detected by the pressure sensor 42. When the difference 'ε' between the target pressure 'F' and the pressure 'P' becomes greater than a predetermined value, the control unit 40 judges that the rapid pressure increase in the second chamber 22 of the booster 14 is required.

Upon sensing the requirement of the rapid pressure increase, the control unit 40 closes the valves 46a and 46b and opens the other values 44a and 44b. With this, the pilot chamber 102 is supplied with a pressurized air from the pressurized air source 36. Thus, as in the case of the aforementioned first embodiment 10A, the plunger 58 and the valve body 62 are moved to their lowermost positions, so that the second chamber 22 of the booster 14 communicates with the pressurized air source 36 and isolated from the atmosphere. Thus, the pressurized air is quickly fed into the second chamber 22 and starts to move the power piston 24 of the booster 14 forward against the return spring 30.

During this, the pressure in the pilot chamber 102 is kept detected by the pressure sensor 42. When, thereafter, the difference 'ε' becomes smaller than the predetermined value (see the point 'D' of the graph of FIG. 4), the control unit 40 now judges that the rapid pressure increase in the second chamber 22 of the booster 14 is not required any longer, and thus closes the valve 44a. Thus, thereafter, the air supply to the pilot chamber 102 is made slowly through only the valve 44b. This operation is advantageous in preventing or at least minimizing the pressure overshooting phenomenon in the pilot chamber 102.

When thereafter the pressure in the pilot chamber 102 comes to a value which is determined by the information signal from the pedal force detecting device 34 and thus the difference 'ε' becomes substantially zero (see the point 'E' of the graph of FIG. 4), the control unit 40 closes the valve 44b. Thus, thereafter, the pressure in the pilot chamber 102 is kept constant. The plunger 58 then moves upward and stops at the afore-mentioned balanced position so that both the first and second valve seats 56 and 60 are in sealing contact with the upper flat portion of the valve body 62. Thus, the second chamber 22 of the booster 14 can contain a pressurized air, the pressure of which being determined in accordance with the brake pedal force applied to the input rod 28 of the booster 14 from the brake pedal 12. Thus, the power piston 24 and the output rod 32 of the booster 14 are moved forward to practically actuate the piston of the associated brake master cylinder for braking the vehicle.

When, on the contrary, the control unit 40 judges that the brake pedal depression does not require the rapid pressure increase in the second chamber 22 of the booster 14, that is, when the brake pedal 12 is depressed slowly by the driver, the control unit 40 closes the valves 46a and 46b and opens only the valve 44b. With this, the air supply from the air source 36 to the pilot chamber 102 is made through only the valve 44b. Thereafter, the relay valve 48 operates in substantially the same manner as that mentioned hereinabove, so that the second chamber 22 of the brake booster 14 contains a desired pressure determined in accordance with the brake pedal force applied to the input rod 28 of the booster 14. It is to be noted that the slow supply of pressurized air to the pilot chamber 102 minimizes the undesirable overshooting phenomenon of pressure in the pilot chamber 102. It is known from experience that such slow supply does not deteriorate the brake operation feeling when the brake pedal 12 is slowly depressed.

When brake pedal 12 is released and no brake pedal force is applied to the input rod 28 of the booster 14, the pedal force detecting device 34 issues a corresponding information signal to the control unit 40. With this, the control unit 40 opens the valves 46a and 46b keeping the other valves 44a and 44b in their closed positions. Thus, the pressurized air in the second chamber 22 of the booster 14 is discharged into the atmosphere in such a manner as has been described in the part of the first embodiment 10A.

Figure 5:
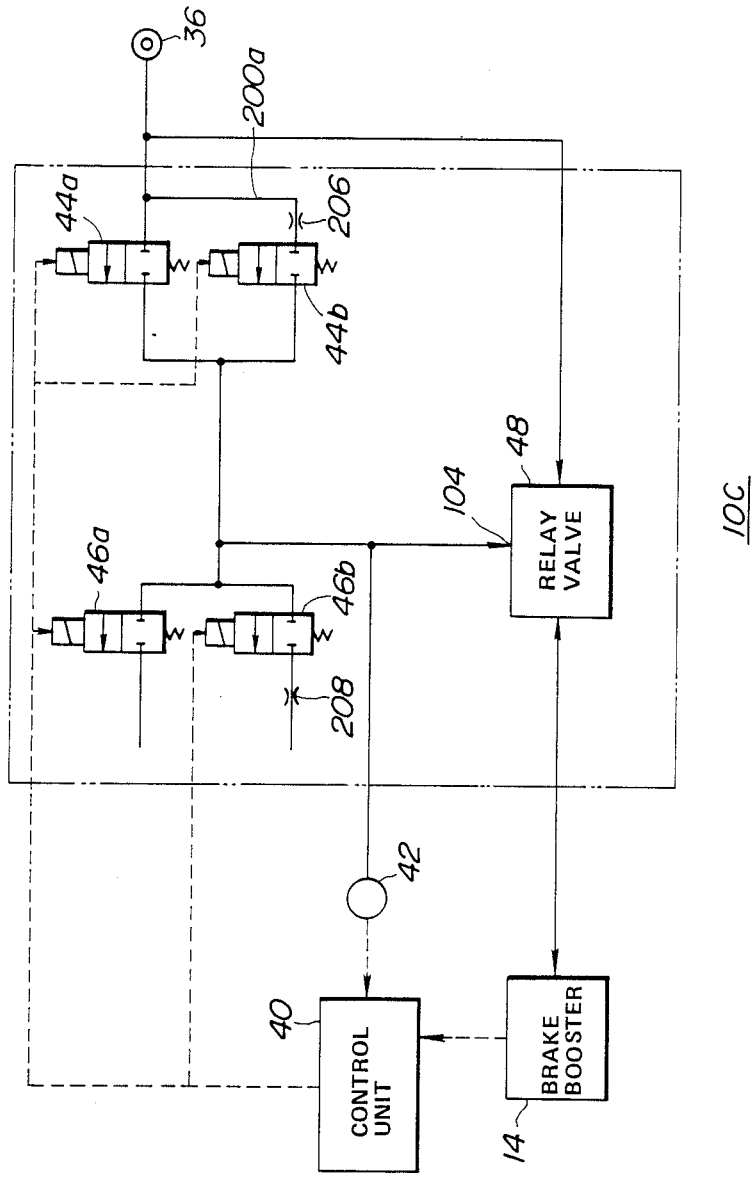
FIG. 5 is a block diagram of a pneumatic power brake system of a third embodiment of the present invention.

Referring to FIG. 5, there is shown a third embodiment of the present invention, which is generally designated by numeral 10C. This embodiment is substantially the same as the above-mentioned second embodiment 10B except for some parts. That is, in this third embodiment, an orifice 206 is disposed in the line 200a in a manner to increase the air flow resistance of the valve 44b. Another orifice 208 is disposed in the discharging line of the valve 46b in a manner to increase the air flow resistance of the valve 46b.

Operation is as follows:

Under a rest condition of the brake system 10C, the valves 44a and 44b are closed and the other two valves 46a and 46b are opened so that the pilot chamber 102 of the relay valve 48 is open to the atmosphere. Under this condition, as has been described hereinabove, the second chamber 22 of the brake booster 14 is communicated with the atmosphere thereby to keep the power piston in its rest position.

When the brake pedal 12 is depressed and a certain brake force is applied to the input rod 28 of the booster 14, the control unit 40 makes a judgement as to whether the depression of the brake pedal 12 requires a rapid pressure increase in the second chamber 22 of the booster 14 by taking the same judging method as has been described in the part of operation of the second embodiment.

Upon judgement of such requirement, the control unit 40 closes the valves 46a and 46b and opens the other valves 44a and 44b. With this, the pilot chamber 102 is supplied with the pressurized air from the air source 36. Thus, due to movement of the piston 92 (see FIG. 3) and the plunger 58, the pressurized air is quickly fed to the second chamber 22 of the booster and starts to move the power piston 24 of the same forward against the return spring 30.

During this, the pressure sensor 42 keeps detecting the pressure in the pilot chamber 102. When thereafter the control unit 40 now judges that the rapid pressure increase in the second chamber 22 of the booster 14 is not required any longer, the control unit 40 closes the valve 44a. Thus, thereafter, the pressurized air supply to the pilot chamber 102 is made slowly through only the valve 44b which is equipped with the orifice 206. By the provision of the orifice 206, the undesirable pressure overshooting phenomenon in the pilot chamber 102 is much more effectively suppressed.

When thereafter the pressure in the pilot chamber 102 comes to the desired value, the control unit 40 closes the valve 44b. Thus, thereafter, the pressure in the pilot chamber 102 is kept constant. Upon this, the plunger 58 moves to and stops at the afore-mentioned balanced position thereby isolating the second chamber 22 of the booster 14 from the air source 36 as well as the atmosphere. Thus, the second chamber 22 of the booster 14 can contain a desired pressure determined in accordance with the braked pedal force.

When, on the contrary, the control unit 40 judges that the brake pedal depression is made slowly (that is, the depression does not require the rapid pressure increase in the second chamber 22 of the booster 14), the control unit 40 closes the valves 46a and 46b and opens only the valve 44b. With this, the air supply to the pilot chamber 102 is made through only the valve 44b which is equipped with the orifice 206. Thereafter, the relay valve 48 operates in substantially the same manner as that mentioned hereinabove, so that the second chamber 22 of the brake booster 14 contains a desired pressure determined in accordance with the brake pedal force. It is to be noted that due the provision of the orifice 206, the undesirable pressure overshooting phenomenon in the pilot chamber 102 is much more effectively suppressed as compared with the case of the second embodiment 10B.

When the brake pedal 12 is released and no brake pedal force is applied to the input rod 28 of the booster 14, the control unit 40 judges whether the brake pedal 12 was released so as to require a rapid pressure decrease in the second chamber 22 of the booster, that is, whether the brake pedal releasement is a rapid releasement, by taking substantially the same judging method as that described in the second embodiment 10B.

Upon sensing the requirement of rapid pressure decrease, the control unit 40 opens the valves 46a and 46b keeping the other two valves 44a and 44b in their closed positions. Thus, due to the movement of the plunger 58, the pressurized air in the second chamber 22 starts to discharge into the atmosphere through the port 78. During this, the pressure sensor 42 keeps sensing the pressure in the pilot chamber 102. When now the control unit 40 judges that the rapid pressure decrease in the second chamber 22 is not required any longer, the control unit 40 closes the valve 46a. Thus, thereafter, the air discharge from the pilot chamber 102 is made slowly through only the valve 46b which is equipped with the orifice 208. By the provision of the orifice 208, the undesirable pressure undershooting phenomenon in the pilot chamber 102 is prevented or at least minimized. After a while, the control unit 40 opens the valve 46a again thereby causing the power piston 24 of the booster 14 to assume its rest position.

On the contrary, when the control unit 40 judges that the brake pedal 12 was released so as not to require the rapid pressure decrease in the second chamber 22 of the booster, that is, when the brake pedal 12 is released slowly, the control unit 40 opens only the valve 46b keeping the other two valves 44a and 44b in their closed positions. With this, the air discharge from the second chamber 22 of the booster 14 to the atmosphere is somewhat delayed as compared with the above-mentioned rapid case. However, experience has revealed that such delay has substantially no effect on the braking feeling when the foot of the driver is slowly released from brake pedal 12. In fact, providing the valve 46b with the orifice 208 minimizes the undesirable pressure undershooting phenomenon in the pilot chamber 102.

Figure 6:
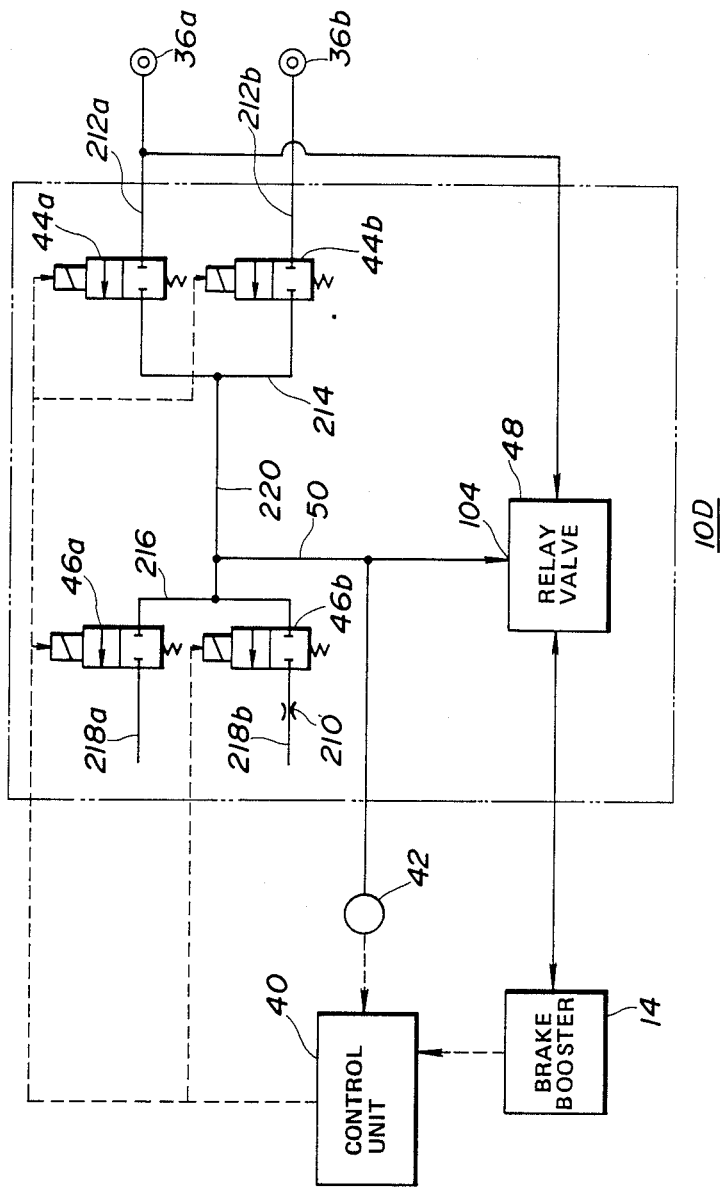
FIG. 6 is a block diagram of a pneumatic power brake system of a fourth embodiments of the present invention.

Referring to FIG. 6, there is shown a fourth embodiment of the present invention, which is generally designated by numeral 10D. This embodiment is similar to the afore-mentioned second embodiment 10B. Thus, only the parts which are different from these of the second embodiment will be described in detail in the following.

In the fourth embodiment 10D, higher and lower air pressure sources 36a and 36b are employed and one orifice 210 is disposed in the discharging line of the valve 46b. As is seen from the drawing, the upstream sides of the valves 44a and 44b are respectively connected to the higher and lower air pressure sources 36a and 35b through respective lines 212a and 212b, while, the downstream sides of these valves 44a and 44b are connected through a line 214. The upstream sides of the other valves 46a and 46b are connected through a line 216, and the downstream sides of these valves 46a and 46b are communicated with the atmosphere through respective lines 218a and 218b. The lines 214 and 216 are connected through a line 220 from which a line 50 leads to the fourth port 104 (see FIG. 3) of the relay valve 48. The orifice 210 is disposed in the line 218b in a manner to increase the air flow resistance of the valve 46b.

Operation is as follows:

Under a rest condition of the brake system 10D, the valves 44a and 44b are closed and the other valves 46a and 46b are opened so that the pilot chamber 102 is open to the atmosphere. Under this condition, the power piston 24 of the brake booster 14 assumes its rest position, as is described hereinabove.

When the brake pedal 12 is depressed, the control unit 40 makes a judgement as to whether the rapid pressure increase in the second chamber 22 of the booster, that is, whether the depression is a rapid depression, by taking the afore-mentioned judging method. When the rapid pressure increase is required, the control unit 40 closes the valves 46a and 46b and opens only the valve 44a. With this, the higher air pressure is supplied to the pilot chamber 102. Thus, due to the movement of the plunger 58, the highly pressurized air is quickly fed to the second chamber 22 of the booster 14 and starts to move the power piston 24 forward.

During this, the pressure sensor 42 keeps detecting the pressure in the pilot chamber 102. When thereafter the control unit 40 judges that the rapid pressure increase in the second chamber 22 of the booster 14 is not required any longer by the second chamber 22, the control unit 40 closes the valve 44a and opens the other valve 44b. Thus, thereafter, the air supply to the pilot chamber 102 is made slowly from the lower pressure source 36b. Like in the cases as has been described hereinabove, such slow air supply prevents or at least minimizes the undesirable pressure overshooting phenomenon in the pilot chamber 102.

When, thereafter, the pressure in the pilot chamber 102 comes to the desired value, the control unit 40 closes the valve 44b, so that thereafter, the pressure in the pilot chamber 102 is kept constant. Upon this, the plunger 58 moves to the above-mentioned balanced position thereby isolating the second chamber 22 of the booster 14 from the air sources 36a and 36b as well as the atmosphere. Thus, the second chamber 22 can contain a desired pressure determined in accordance with the brake pedal force applied to the input rod 28 of the booster 14.

When, on the contrary, the control unit 40 judges that the brake pedal depression does not require the rapid pressure increase in the second chamber 22 of the booster 14 (that is, when the closes the valves 46a and 46b and opens only the valve 44b. With this, the air supply to the pilot chamber 102 is made only from the lower pressure source 36b. Thereafter, the relay valve 48 operates in substantially the same manner as that mentioned hereinabove, so that the second chamber 22 of the booster 14 contains a desired pressure determined in accordance with the brake pedal force. It is to be noted that the lower pressure air supply to the pilot chamber 102 prevents or at least minimizes the undesirable overshooting phenomenon in the pilot chamber 102.

Since the operation taken when the brake pedal 12 is released is substantially the same as that is the aforementioned third embodiment 10C, it will be omitted.

Figure 7:
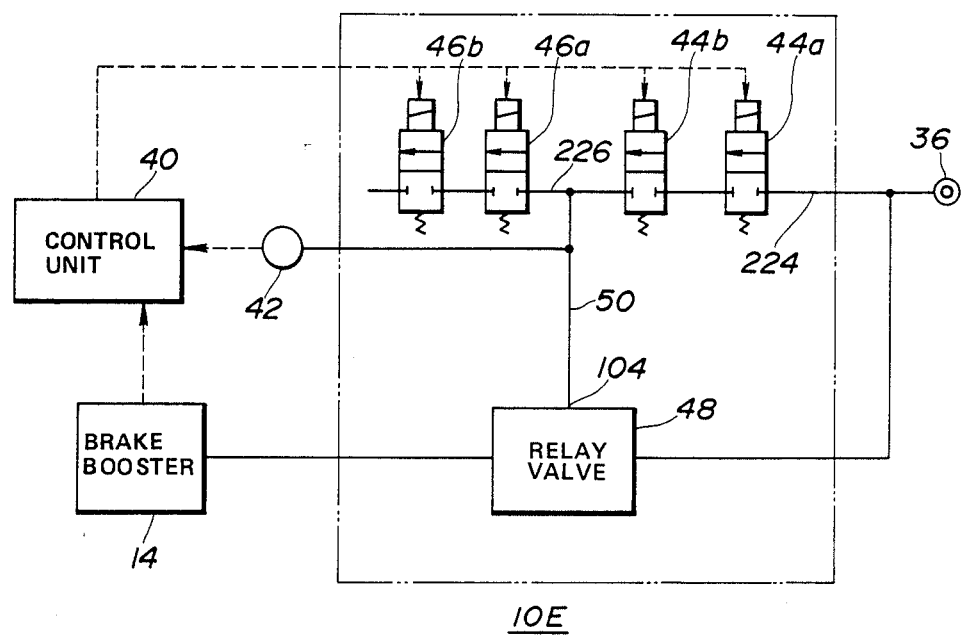
FIG. 7 is a view similar to FIG. 6, but showing a fifth embodiment of the present invention.

Referring to FIG. 7, there is shown a fifth embodiment of the present invention, which is generally designated by numeral 10E. The fifth embodiment 10E is substantially the same as the first embodiment 10A except the number and arrangement of the electromagnetic valves.

As is seen from the drawings, four electromagnetic valves 44a, 44b, 46a and 46b are used. The valves 44a and 44b are connected in series and the upstream positioned valve 44a is connected to the pressurized air source 36 through a line 224. The other two valves 46a and 46b are connected in series, and the upstream positioned valve 46a is connected to the valve 44b through a line 226 from which a line 50 leads to the fourth port 104 of the relay valve 48. The downstream side of the valve 46b is communicated with atmosphere through a line (no numeral). For ease of the following description, the valves 44a and 44b will be referred to as 'inlet group', while, the other two valves 46a and 46b will be referred to as 'outlet group'.

Figure 8A:
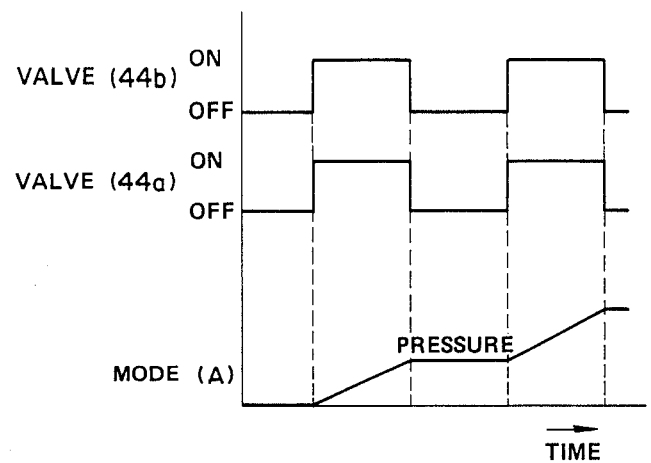
FIGS. 8A and 8B are graphs showing ON-OFF modes of valves employed in the system of the fifth embodiment.
Figure 8B:
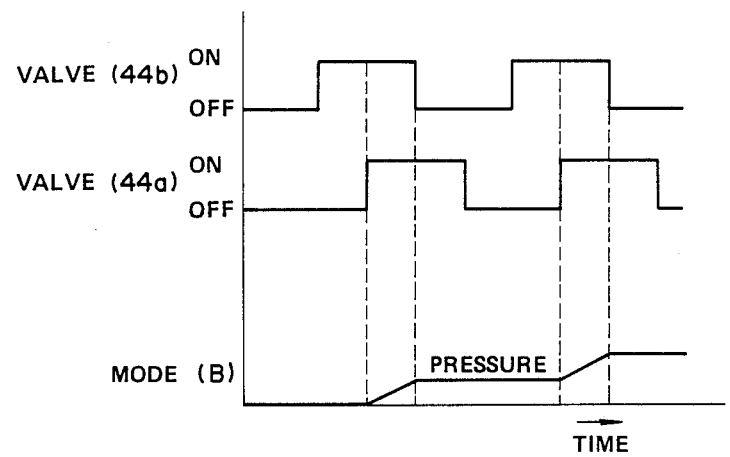

In this fifth embodiment, first and second modes 'A' and 'B°' are provided for each group of the valves. That is, when the valves 44a and 44b (or 46a and 46b) of each group make their open-close operations synchronously with identical phases, they constitute the first mode 'A' wherein a larger amount of air can pass therethrough. However, when the valves of each group makes their open-close operations with different phases, they constitute the second mode 'B' wherein only a smaller amount of air can pass therethrough. This will be understood from the graphs of FIGS. 8A and 8B which show the cases of the inlet group.

Operation is as follows:

Under a rest condition of the brake system 10E, the valves 46a and 46b of the outlet group are opened and at least one of the valves 44a and 44b of the inlet group is closed so that the pilot chamber 102 of the relay valve 48 is open to the atmosphere. Under this condition, the power piston 24 of the brake booster 14 assumes its rest position.

When the brake pedal 12 is depressed, the control unit 40 makes a judgement as to whether the depression requires the rapid pressure increase in the second chamber 22 of the booster 14, that is, whether the depression is a rapid depression. When the rapid pressure increase is required, the control unit 40 closes at least one of the valves 46a and 46b of the outlet group and causes the valves 44a and 44b of the inlet group to take the first mode 'A'. Thus, the pressurized air is quickly supplied to the pilot chamber 102. Thus, due to the movement of the plunger 58, the pressurized air is quickly fed to the second chamber 22 of the booster 14 and starts to move the power piston 24 forward.

During this, the pressure in the pilot chamber 102 is kept detected by the pressure sensor 42. When thus the control unit 40 now judges that the rapid pressure increase in the second chamber 22 of the booster 14 is not required any longer by the second chamber 22, the control unit 40 causes the valves 44a and 44b of the inlet group to take the second mode 'B'. Thus, thereafter, the air supply to the pilot chamber 102 is made slowly. As has been described hereinbefore, such slow air supply prevents or at least minimizes the undesirable pressure overshooting phenomenon in the pilot chamber 102.

When, thereafter, the pressure in the pilot chamber 102 comes to the desired value, the control unit 40 closes at least one of the valves 44a and 44b of the inlet group, so that thereafter, the pressure in the pilot chamber 102 is kept constant. Upon this, the plunger 58 moves to the above-mentioned balanced position thereby isolating the second chamber 22 of the booster 14 from the surrounding. Thus, the second chamber 22 can contain a desired pressure which is determined in accordance with the brake pedal force applied to the input rod 28 of the booster 14.

When, on the contrary, the control unit 40 judges that the brake pedal depression does not require the rapid pressure increase in the second chamber 22 of the booster 14 (that is, when the depression is made slowly), the control unit 40 closes at least one of the valves 46a and 46b of the outlet group and causes the valves 44a and 44b of the inlet group to select the second mode 'B'. With this, the air supply to the pilot chamber 102 is made slowly. The relay valve 48 thus thereafter operates in the same manner as is described hereinabove, so that the second chamber 22 of the booster 14 contains a desired pressure. It is to be noted that such slow air supply to the pilot chamber 102 prevents or at least minimizes the undesirable pressurer overshooting phenomenon in the pilot chamber 102.

When the brake pedal 12 is released and no brake pedal force is applied to the input rod 28 of the booster 14, the control unit 40 judges whether the brake pedal 12 was released so as to require a rapid pressure decrease in the second chamber 22 of brake booster 14 that is, whether the releasement is a rapid releasement.

When a requirement of pressure release rapid from the pedal 12 is judged, the valves 46a and 46b of the outlet group are caused to select the first mode 'A' keeping one of the valves 44a and 44b in its closed position. Thus, due to the movement of the plunger 58, the pressurized air in the second chamber 22 starts to discharge into the atmosphere through the port 78. During this, the pressure in the pilot chamber 102 is detected by the pressure sensor 42, so that when the control unit 40 now judges that the rapid pressure decrease is not required any longer, the control unit 40 causes the valves of the outlet group to select the second mode 'B'. Thus, thereafter, the air discharge from the pilot chamber 102 is made slowly. Such slow air discharge prevents or at least minimizes the undesired pressure undershooting phenomenon. After a while, the valves 46a and 46b of the outlet group are both opened.

On the contrary, when the control unit 40 judges that the brake pedal was not released so as to require to rapid pressure decrease in the second chamber 22 of the booster 14, that is, when the brake pedal releasement is made slowly, the control unit 40 causes the valves of the outlet group to select the second mode 'B'. With this, the air discharge from the second chamber 22 of the booster 14 is somewhat delayed as compared with the above-mentioned rapid case. However, such delay has substantially no effect on the braking feeling when the foot of the driver is slowly released from the brake pedal 12. In fact, usage of such slow air discharge prevents or at least minimizes the undesirable pressure undershooting phenomenon in the pilot chamber 102.

What is claimed is:

1. A pneumatic power brake system comprising:
    a pressurized air source;
    a brake booster with a work chamber and an input means for receiving brake pedal force;
    a pedal force detecting means for detecting a brake pedal force applied to the input means of said brake booster;
    a relay valve pneumatically connected to both said pressurized air source and said work chamber and interposed therebetween, said relay valve having a pilot chamber, said relay valve being connected to supply pressurized air to said work chamber, the pressure of the pressurized air corresponding to that of a pressure applied to said pilot chamber;
    an electromagnetically operated valve means connected to selectively connect said pilot chamber with said pressurized air source and the atmosphere thereby applying a pressure to the pilot chamber;
    an electronic control unit connected to control said electromagnetically operated valve means to supply to said pilot chamber pressurized air, the pressure of which being determined in accordance with said brake pedal force; and
    a pressure sensor connected to detect the pressure in said pilot chamber and to provide said electronic control unit with pressure data for feedback control.

2. A pneumatic power brake system as claimed in claim 1, in which said electromagnetically operated valve means comprises:
    a first electromagnetic valve interposed between said pilot chamber and said pressurized air source; and
    a second electromagnetic valve interposed between said pilot chamber and the atmosphere,
    where said electronic control unit is programmed, when a brake pedal force is applied to the input means of said brake booster, to close said second electromagnetic valve and at the same time open said first electromagnetic valve until the pressure in said pilot chamber comes to a desired degree and then to close said first electromagnetic valve.

3. A pneumatic power brake system comprising:
    a pressurized air source;
    a brake booster with a work chamber and an input means for receiving brake pedal force;
    a pedal force detecting means for detecting a brake pedal force applied to the input means of said brake booster;
    a relay valve pneumatically connected to both said pressurized air source and said work chamber and interposed therebetween, said relay valve having a pilot chamber, said relay valve being connected to supply pressurized air to said work chamber, the pressure of the pressurized air corresponding to that of a pressure applied to said pilot chamber;
    an electromagnetically operated valve means connected to selectively connect said pilot chamber with said pressurized air source and the atmosphere thereby applying a pressure to the pilot chamber;
    an electronic control unit connected to control said electromagnetically operated valve means to supply to said pilot chamber pressurized air,t the pressure of which being determined in accordance with said brake pedal force; and
    a pressure sensor connected to detect the pressure in said pilot chamber and to provide said electronic control unit with pressure data for feedback control;
    wherein said electromagnetically operated valve means comprises:
    a first group of two electromagnetic valves which are interposed in parallel between said pilot chamber and said pressurized air source; and
    a second group of two electromagnetic valves which are interposed in parallel between said pilot chamber and the atmosphere,
    wherein said electronic control unit is programmed, when a brake pedal force is rapidly applied to the input means of said brake booster, to close both the two valves of said second group and at the same time open both the two valves of said first group, and thereafter to close one of the two valves of said first group, and thereafter to close the other of the two valves of said first group, and
    wherein said electronic control unit is further programmed, when a brake pedal force is relatively slowly applied to the input means of said brake booster, to close both the two valves of said second group and at the same time open one of the valves of said first group, and thereafter to close the other.

4. A pneumatic power brake system as claimed in claim 3, further comprising a first line connecting said the other valve of said first group to said pressurized air source and a first orifice disposed in the first line.

5. A pneumatic power brake system as claimed in claim 4, further comprising a second line connecting one of the two valves of said second group to the atmosphere and a second orifice disposed in the second line.

6. A pneumatic power brake system as claimed in claim 1, in which said pressurized air source includes higher and lower pressure sources, and in which said electromagnetically operated valve means comprises:
    a first group of two electromagnetic valves interposed in parallel, a first valve interposed between said pilot chamber and said higher pressure source and a second valve interposed between said pilot chamber and said lower pressure source;
    a second group of two electromagnetic valves interposed in parallel between said pilot chamber and the atmosphere;
    a third line connecting one of the two valves of said second group to the atmosphere and a third orifice disposed in the third line, wherein said electronic control unit is programmed, when a brake pedal force is rapidly applied to the input means of said brake booster, to close both the two valves of said second group and at the same time open only the first valve of the first group connected to the higher pressure source, and thereafter to close the first valve of the first group and open the second valve of the first group, and thereafter to close the second valve of the first group.

7. A pneumatic power brake system as claimed in claim 1, in which said electromagnetically operated valve means comprise:

a first group of two tandem arranged electromagnetic valves interposed between said pilot chamber and said pressurized air source, said first group of valves operable in a first mode in which a larger amount of air can pass through the two valves and in a second mode in which a smaller amount of air can pass through the two valves;

a second group of two tandem arranged electromagnetic valves interposed between said pilot chamber and the atmosphere;

wherein said electronic control unit is programmed, when a brake pedal force is applied to the input means of the brake booster, to close the two valves of the second group and at the same time to operate the two valves of the first group in the first mode, and thereafter to operate the two valves of the first group in the second mode, and thereafter to close one of the valves of the first group.

8. A pneumatic power brake system as claimed in claim 1, in which said relay valve comprises:

a housing having a stepped bore formed therein;

a valve mechanism movably disposed in said stepped bore of said housing, said valve mechanism having first, second and third conditions, said first condition being a condition wherein the work chamber of said brake booster is isolated from both the pressurized air source and the atmosphere, said second condition being a condition wherein said work chamber is communicated with said pressurized air source but isolated from the atmosphere and the third condition being a condition wherein the work chamber is communicated with the atmosphere but isolated from the pressurized air source;

an axially movable plunger operatively disposed in said housing to actuate said valve mechanism; and means for defining in said housing a pilot chamber into which an end of said plunger is exposed so that upon application of any pressure to said pilot chamber, said plunger is moved causing said valve mechanism to assume one of said first and second conditions.

* * * * *

UNITED STATES PATENT AND TRADEMARK OFFICE
CERTIFICATE OF CORRECTION

PATENT NO. : 4,835,970

DATED : June 6, 1989

INVENTOR(S) : Shimamura et al.

It is certified that error appears in the above-identified patent and that said Letters Patent is hereby corrected as shown below:

Title page:

[73] Assignee: Nissan Motor Co., Ltd., Japan and Jidosha Kiki Co., Ltd., Japan

Signed and Sealed this

Fifth Day of March, 1991

Attest:

HARRY F. MANBECK, JR.

*Attesting Officer*  *Commissioner of Patents and Trademarks*